March 10, 1942. F. KUHN ET AL Re. 22,048

ELECTRIC IRON

Original Filed April 1, 1940 2 Sheets-Sheet 1

INVENTORS
FRANK KUHN
LAURENCE H. THOMAS

BY Whittemore Hulbert & Belknap
ATTORNEYS

March 10, 1942. F. KUHN ET AL Re. 22.048

ELECTRIC IRON

Original Filed April 1, 1940 2 Sheets-Sheet 2

INVENTORS
FRANK KUHN
LAURENCE H. THOMAS
BY Whittemore Hulbert & Belknap
ATTORNEYS Reissued Mar. 10, 1942 Re. 22,048

UNITED STATES PATENT OFFICE 22,048

ELECTRIC IRON

Frank Kuhn, Grosse Pointe Farms, and Laurence H. Thomas, Birmingham, Mich., assignors to American Electrical Heater Company, Detroit, Mich., a corporation of Michigan Original No. 2,235,891, dated March 25, 1941, Serial No. 327,306, April 1, 1940. Application for reissue September 29, 1941, Serial No. 412,915

11 Claims. (Cl. 219—25)

In the development of many articles of commerce, including tools for industrial or domestic use, the external appearance or ornamental design is an important factor. Such designs frequently follow some general pattern or style, as for instance, the changes in designs of furniture follow those in architecture, and in the same manner streamline designs first applied to high speed vehicles are followed in the design of many other articles of manufacture. Such changes in external contour may require the redesigning of the mechanical structure and frequently with advantageous results.

It is the primary object of the instant invention to obtain a construction of electric laundry iron, which is adapted to a streamline external contour. It is a further object to obtain an improved and novel construction having various advantages, as hereinafter set forth.

Figure 1:
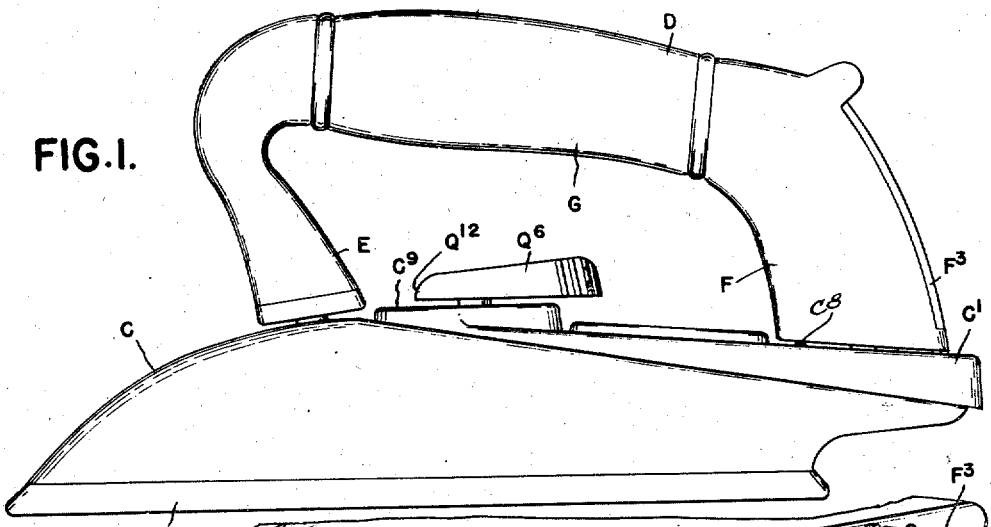
Fig. 1 is a side elevation.
Figure 2:
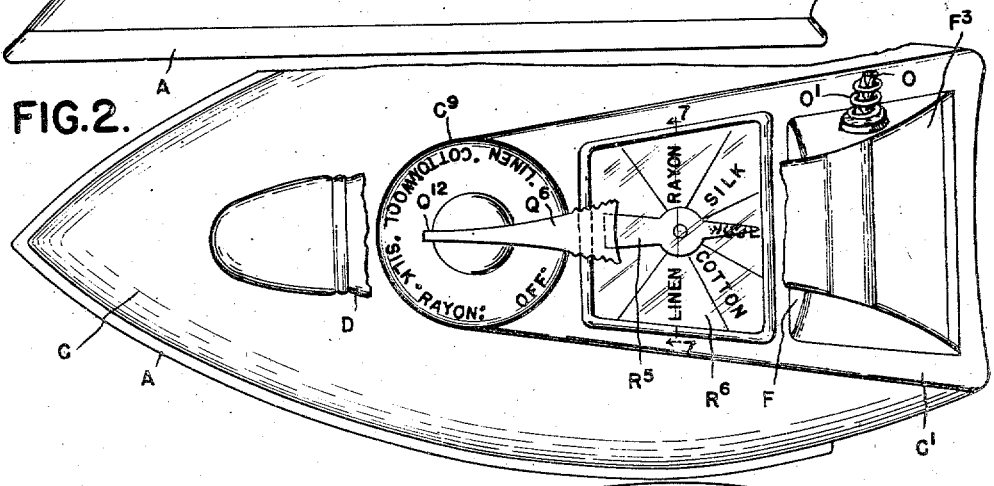
Fig. 2 is a top plan view with the handle partly broken away.
Figure 3:
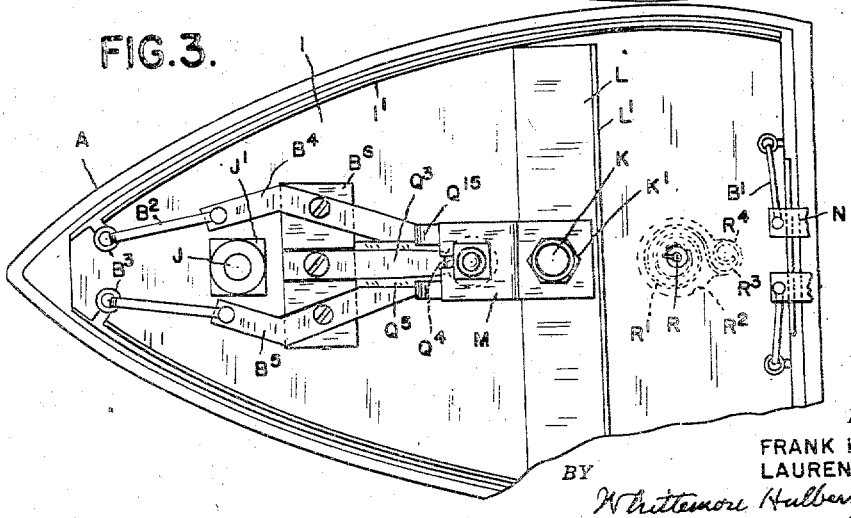
Fig. 3 is a plan view with the hood removed.
Figures 4, 5, 6, 7:
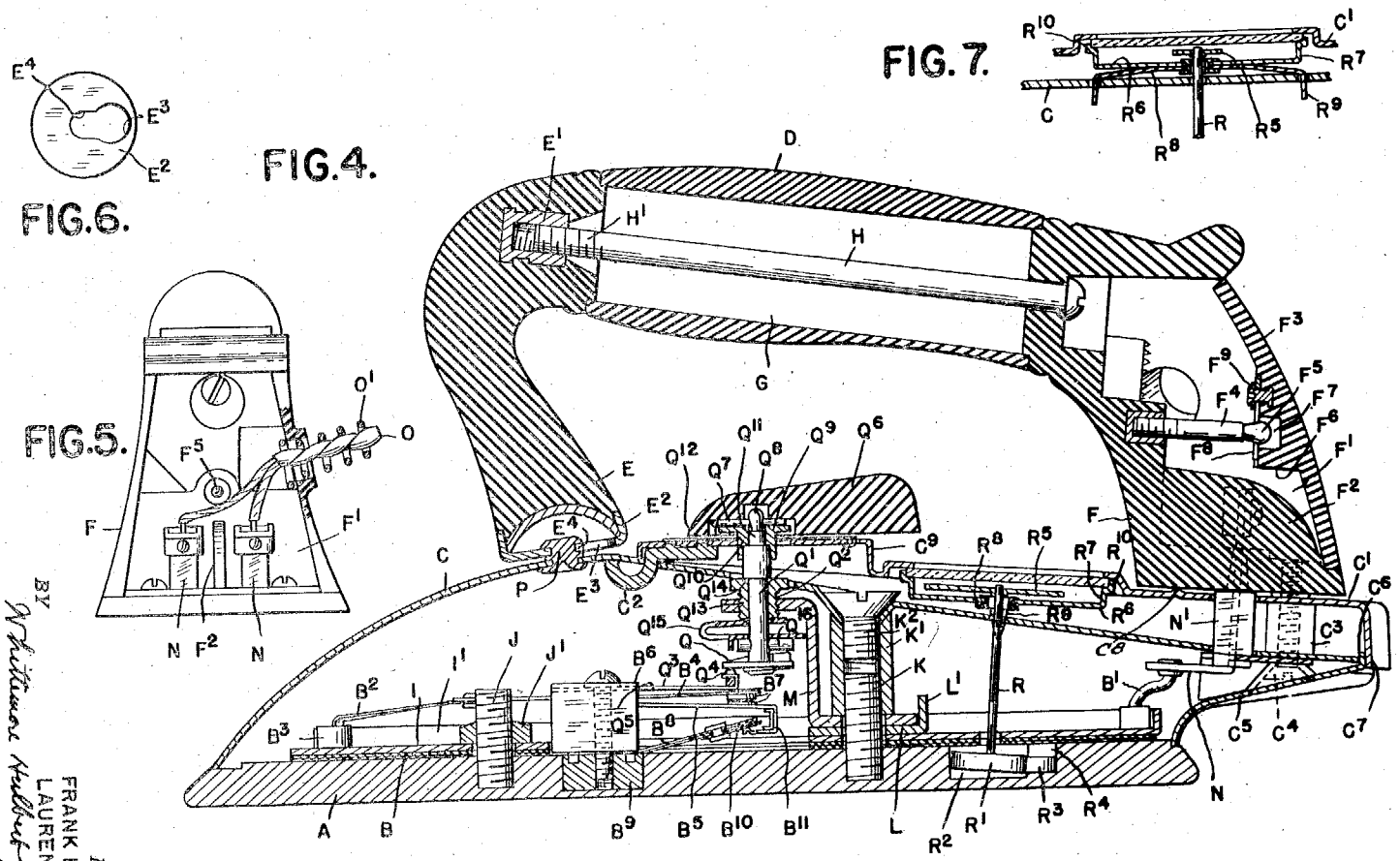
Fig. 4 is a vertical central longitudinal section.
Fig. 5 is a rear elevation of the handle with the cover removed.
Fig. 6 is a bottom plan view of the metallic cap on the handle.
Fig. 7 is a section taken on line 7—7 of Fig. 2.

Electric laundry irons as heretofore constructed are usually provided with a base or sole plate which is heated by an electrical unit placed above the same and clamped in contact therewith. There is also a hood covering the unit, and a handle secured to the hood. Electrical current is supplied to the unit through a conductor cord which is usually plugged into a socket on the hood in rear of the handle. Our improved construction comprises a base or sole plate A of conventional form tapering to a point at its front end with arcuate sides and a straight line rear end. B is the electrical heating unit clamped to the top of the base, and C is the hood. To impart a streamline appearance to the iron, the hood C has a rounded front or nose portion rising to a point less than half the distance to the rear end of the base, and then tapering downward toward the rear. It is also extended some distance beyond the base with its sides tapering inward, thereby further increasing the streamline appearance. The handle D is also streamline, having an upwardly and forwardly inclined portion E at its front end, a downwardly and rearwardly inclined portion F at its rear end, and a central hollow connecting portion G slightly downwardly inclined toward the rear. These portions are preferably separate members formed of some synthetic molded material, such as "Bakelite." They may be secured to each other by a bolt H having its head in a recess in the rear member F and its threaded portion H' engaging a nut E' embedded in the forward member E. This handle, together with the hood portion, imparts a streamline appearance to the whole.

More in detail, the electrical heating unit B is of the usual type including a ribbon resistor and mica insulation. The unit is clamped to the base A preferably by a sheet metal member I of similar form, having upwardly projecting reenforcing flanges I' extending along its opposite sides. A screw threaded stud J is engaged with the correspondingly threaded socket in the base and projects upward therefrom through the unit and the member I, and a nut J' engaging this stud forms the clamping means. There is also a second stud K in rear of the stud J, threadedly engaging the base A and passing through the unit, the member I, and a transversely extending reenforcing member L. The latter has an upwardly extending reenforcing flange L' which imparts sufficient thereto to clamp the member I and unit B to the base throughout the entire width. A nut K' engaging the stud K forms the clamping means, and this nut also clamps in position a bracket member M used in connection with the thermostat as hereinafter set forth. The hood C is secured to the base by a screw $K^2$, the head of which engages a conical recess in the hood while the threaded portion is engaged with the upper portion of the nut K'.

The hood C has a central deck portion C' beneath the handle D, which is raised above the side portions at the rear end directly beneath the member F and tapers to merge with the side portions at its forward end. While this portion might be formed integral with the other portions of the hood, this would increase the difficulty in manufacturing the hood from pressed sheet metal. We, therefore, preferably form the member C' as a separate stamping, which at its forward end is provided with a hook $C^2$ for extending through an aperture in the member C, while at its rear end it is provided with depending lugs $C^3$, welded or otherwise secured thereto forming internally threaded sockets. Screws $C^4$ passing upwardly through the member C and engaging said sockets serve to clamp downward the member C' and, in connection with the hook $C^2$, securely fasten this member to the member C. The housing is completed by a bottom plate $C^5$ which at its forward end rests upon a ledge on the rear end of the base plate A, and at its rear end has an up-turned flange $C^6$ which is held in a slot between the top of the member C and a downwardly extending rear flange $C^7$ of the member C'. The screws $C^4$ also pass through the member $C^5$, the heads of said screws engaging conical recesses in said member and thereby securely holding it in place.

The terminals for the resistor of the electrical heating unit are located in the overhanging portion of the hood which is in rear of the base A. These terminals are in the form of flat bars N passing through an insulator block N', which in turn passes through registering apertures in the hood C and member C'. The bars N at their lower ends are bent at substantially right angles to extend forwardly and are connected respectively to the ends of the resistor ribbon B'. The upper ends of the bars N extend into a chamber F' within the member F, which chamber is centrally divided by an upwardly extending partition $F^2$ separating the bars N from each other. The flexible conductor cord O extends through a lateral opening in the member F into the chamber F', and the two conductors pass on opposite sides of the partition $F^2$ and are secured to the bars N by the usual clamping means. To permit of making these connections, the chamber F' within the member F is open at the rear, but is normally closed by a cover plate $F^3$. This preferably has a snap-on engagement with the member F formed by a post $F^4$ extending rearward within the chamber and provided at its rear end with a knob $F^5$. The cover plate $F^3$ has an inwardly extending lug $F^6$ recessed at $F^7$ to receive the knob $F^5$, and spaced spring arms $F^8$ secured to said lug by a rivet $F^9$ are positioned for the knob $F^5$ to pass therebetween. Thus, these spring arms engaging the tapering shank of the knob, will draw the cover plate to its seat. The usual coil spring protector O' is provided for the portion of the flexible conductor cord, which passes through the aperture in the member F and extends outward adjacent thereto.

To secure the handle to the hood, a grooved post P is riveted or otherwise secured to the hood to extend upward in central alignment with the member E. The latter has secured to its lower end a metallic cap $E^2$ having an aperture $E^3$ therein for the entrance of the post P and a narrower slot $E^4$ extending from said aperture to the center of the cap. This forms a bayonet joint, the portions of the cap on opposite sides of the slot slidably engaging the groove in the post and thereby securing the member E to the hood. The member F is secured to the rearwardly overhanging portion of the hood by screws which pass through apertures in the bottom of said member, registering with the internally threaded lugs $C^3$. Thus, when the cover plate $F^3$ is removed, these screws may be inserted through said apertures and engaged with the lugs $C^3$ to clamp the member F against the hood. Conduction of heat from the hood into the handle is minimized by forming struck-up portions $C^8$ on the member C', which have only a very limited area of contact with the member F. Also, the small cross sectional area of the post P limits the heat conduction from the hood C into the member E.

The rate of heat generation in the unit P is controlled by an adjustable thermostatic switch. Usually such thermostatic switches are connected into the circuit at one end of the resistor which is located at the rear end of the base. With the instant construction, we cut the thermostatic switch into the center of the resistor, which is located at the forward end of the base. This is a very convenient arrangement inasmuch as the heating units are usually formed with portions on opposite sides of the center of the base extending longitudinally thereof and passing from one side to the other at the forward end. It is, therefore, only necessary to split the resistor into two portions, each portion having terminals respectively at the rear end and forward end. The forward end portions are then extended to the thermostatic switch, which may be located under the hood forward of the center of the base. As shown, the forward terminals $B^2$ pass upward through insulator sleeves $B^3$ located in apertures in the member I and are attached to flexible resilient strips $B^4$ and $B^5$ mounted on an insulator block $B^6$. The strips $B^4$ and $B^5$ extend rearward from the block $B^6$ at an angle to each other, so that their rear ends come into registration in vertically spaced planes. Cooperating contacts $B^7$ are secured to these strips so that when engaged with each other the circuit will be completed between the terminals $F^2$. The thermostatic bar $B^8$ is preferably connected at one end to an insert $B^9$ located in a recess in the base A and formed of material having relatively high thermal conductivity. The bar $B^8$ inclines upwardly toward its rear end and is so arranged as to be warped downwardly by increase in temperature. Mica or other insulating material $B^{10}$ is secured to the underside and rear end of the bar $B^8$ and the flexible resilient strip $B^5$ is formed at its rear end with a return-bent portion $B^{11}$ which extends in contact with the insulation $B^{10}$. Thus, when the temperature increases beyond a predetermined point, the downward warping of the bar $B^8$ will, through the return-bent portion $B^{11}$, draw the contact $B^7$ on the strip $B^5$ out of engagement with the cooperating contact on the strip $B^4$. The latter contact may be varied in position by lowering or raising the strip $B^4$, which is accomplished through the medium of a rotary cam Q on a vertically extending rotary post Q' journaled in a bearing $Q^2$ on the bracket M. The cam Q directly engages a resilient bar $Q^3$ which is mounted upon the block $B^6$ between the members $B^4$ and $B^5$ and extends rearward into registration with said members. At the rear end of the bar $Q^3$ is an upwardly extending and return-bent portion with a bearing $Q^4$ attached thereto for contacting with the cam Q. This bar $Q^3$ forms a resilient reenforcement for the resilient strip $B^4$, but is insulated therefrom by an intervening mica strip $Q^5$. Thus, a rotation of the post Q' will raise or lower the strip $B^4$ and the contact $B^7$ thereon which will alter the temperature at which the cooperating contact will separate therefrom.

The construction of the handle D previously described is such as to leave a relatively long space between the members E and F thereof. This affords room for the adjusting handle of the thermostatic switch, together with its indicating dial, and also for a thermometer having an indicating dial. The dial for the thermostatic switch is preferably formed by a circular upwardly embossed portion $C^9$ which is concentric with the axis of the post Q'. This portion may be marked with indications, such as rayon, silk, wool, cotton and linen, indicating the different temperatures which are best for these respective materials. The operating lever $Q^6$ for rotating the post Q′ is preferably formed to have a snap-on engagement with the upper end of the post. In detail, the post is formed at its upper end with a portion $Q^7$ reduced in diameter and a knob portion $Q^8$ having a downwardly tapering shank above the portion $Q^7$. The lever $Q^6$ is preferably molded from Bakelite or equivalent material and is recessed on its underside to receive a metallic disk $Q^9$ having a hollow hub portion $Q^{10}$ for fitting over the portion $Q^7$ of the post. Above the disk $Q^9$ the lever $Q^6$ is further recessed to receive a U-shaped resilient member $Q^{11}$ having its arms on opposite sides of the axis of the post. Thus, when the lever is pressed downward on the post, the knob $Q^8$ will force apart the arms of the U, which will spring together on the tapering shank and hold the lever in engagement. A flattened face on the portion $Q^7$ and a corresponding flattened key portion on the hub $Q^{10}$ will serve to transmit torque from the lever to the post. The lever is also provided with an index point $Q^{12}$ for cooperating with the indications on the circular embossed portion $C^9$. Provision is made for vertical adjustment of the post Q′ so as to properly set the cam Q in relation to the strip $B^4$ and arm $Q^3$ of the thermostatic switch. This adjustment is formed by a bushing $Q^{13}$ threadedly engaging the bracket M and forming an end thrust bearing for engaging a shoulder $Q^{14}$ on the post. Below the bushing $Q^{13}$ is a U-shaped resilient member $Q^{15}$ sleeved on the post and having its lower arm positioned by a cross pin $Q^{16}$. Thus, by rotating the bushing $Q^2$, the post may be raised or lowered, thereby setting the switch to correspond with the indications.

While the thermostatic switch controls the heat generation in the electrical unit, it does not in itself indicate the temperature of the working surface of the iron, which may vary in accordance with different conditions in the work. We, therefore, preferably provide a thermometer located in rear of the thermostatic switch and, as shown, constructed as follows: R is a post having secured to its lower end a spiral thermostatic member R′ located in a recess $R^2$ in the base A. The outer end of this spiral is formed into a coil $R^3$ which engages a recess $R^4$ intersecting the recess $R^2$. This forms an anchor connection which holds the spiral portion free within the recess $R^2$. The post R extends upward through registering apertures in the hood C and portion C′ and has attached to its upper end an index hand $R^5$. This index hand is located in the space between the hood C and the member C′ and cooperates with a dial member having indications corresponding to those on the embossed portion $C^9$. The dial may be formed of a member $R^6$ having upwardly extending marginal flanges $R^7$ which are pressed against the underside of the member C′ by a spring $R^8$ beneath the member $R^6$. This spring has downwardly extending prongs $R^9$ engaging apertures in the hood C so as to properly locate the member $R^6$. The member C′ has a window opening registering with the dial in the member $R^6$ and surrounded by an upwardly and inwardly extending marginal flange $R^{10}$. This is adapted to receive a glass or other transparent panel which is held in position by the flanges of the member $R^6$ therebeneath. With the construction as just described, the operator by observing the position of the index hand $R^5$ will be informed as to whether the seating of the thermostatic switch is best suited to the condition of the work.

A laundry iron constructed as above described, not only has a very attractive appearance, but also has various advantageous features. One advantage is that the construction is relatively light. In former times it was supposed that weight in an iron was advantageous, but it is now understood that it is not necessary to proper performance. In our construction, most of the mass of the iron is located in the base, the other elements being largely formed from comparatively thin pressed sheet metal. Also, the handle having the hollow portion G and the chambered rear member F adds but little weight. Another advantage is that the handle is formed of insulating material which diminishes danger of electrical shock to the operator in case of any current leakage. Conduction of heat to the handle is comparatively slight on account of the small contact area between the same and the hood. The combination of the thermometer having visual indications with the adjustable thermostatic switch, enables the operator to accurately adjust heat generation to suit the condition of the work being operated upon. Also, the construction of the hood having the overhanging rearwardly extending portion, together with the construction of the handle, affords abundant space beneath the handle for location of both of the dials, respectively, for the thermostatic switch and the thermometer. The central splitting of the resistor facilitates the location of the thermostatic switch and its connections in the forward portion of the iron, leaving space at the rear for the location of the thermometer. The construction is also one which can be manufactured at relatively low cost and easily assembled, while the recessed rear post of the handle containing the electrical connections and a removable cover therefor, facilitates access for repairs.

What we claim as our invention is:

1. An electric laundry iron of streamline contour comprising a base, an electrical heating unit therefor above the same, a hood covering said base and unit and extending rearward therefrom to form an overhanging portion, and a handle connected to said hood including spaced columns both inclining forwardly in an upward direction and having a handhold connecting said columns inclining slightly downward toward the rear, said rear column rising from said overhanging portion and together therewith constituting a support for holding the iron when out of use in rearwardly inclined upright position.

2. An electric laundry iron of streamline contour comprising a base, an electrical heating unit therefor above the same, a hood covering said base and unit and extending rearward therefrom to form an overhanging portion, said hood rounding upward at its forward end to a high point forward of the longitudinal center of the base and from there sloping downward toward the rear end, and a handle connected to said hood including spaced forward and rear columns both inclining forwardly in an upward direction and having a handhold connecting their upper ends inclining slightly downward toward the rear, said rear column rising from the overhanging portion of said hood.

3. An electric laundry iron of streamline contour comprising a base, an electrical heating unit therefor above the same, a hood covering said base and unit and extending rearward therefrom to form an overhanging portion, said hood rounding upward at its forward end to a high point forward of the longitudinal center of the base and from there sloping downward toward the rear end, a deck rising above the central portion of said hood with its forward end merging with said high point and from there sloping rearward at a downward inclination less than that of said hood, the sides and rear end of said deck extending vertically downward to said hood, and a handle connected to said hood including spaced forward and rear columns both inclining forwardly in an upward direction and having a handhold connecting their upper ends inclining slightly downward toward the rear, said rear column rising from said deck above the overhanging portion of said hood.

4. An electric laundry iron of streamline contour comprising a base, an electrical heating unit above said base, a hood covering said base and heating unit rounding upward from its forward end to a high point forward of the longitudinal center of said base and from there sloping downward toward the rear extending beyond the base to form an overhanging portion, a deck rising above the central portion of said hood with its forward end merging with said high point and from there sloping rearward at a downward inclination less than that of said hood, the sides and rear end of said deck extending vertically downward to said hood and forming between the latter and said deck a heat insulated air chamber, a bottom plate for the overhanging portion of said hood, and a handle connected to said hood including spaced forward and rear columns both inclining forwardly in an upward direction and having a handhold connecting their upper ends inclining slightly downward toward the rear, said rear column being hollow and rising from said deck above the overhanging portion of said hood, terminals for said electrical heating unit extending outward through said overhanging portion and upward into said hollow column, a flexible conductor cord extending into said hollow column and connected to said terminals, and a removable cover for said hollow column permitting access to said terminals and their connections.

5. In an electric laundry iron, the combination with a base and a heating unit above said base, of a hood covering said base and heating unit and extending rearward therefrom to form an overhanging portion, a handle connected to said hood having spaced forward and rear columns and a handhold portion connecting the upper ends thereof, said rear column being hollow, open at the back, and rising from the overhanging portion of said hood, terminals for said electrical heating unit extending outward through said overhanging portion and upward into said hollow column, a flexible conductor cord extending into said hollow column through an aperture in one of its sides and connected with said terminals, and a snap-on rear cover plate for said hollow column providing easy access to said terminals and their connections.

6. An electric laundry iron comprising a base and electrical heating units therefor above the same, a hood covering said base and unit and extending rearward therefrom to form an overhanging portion, and a handle connected to said hood including spaced columns both inclining forwardly in an upward direction and having a handhold connecting the upper ends of said columns, the forward inclination of said columns locating said handle substantially above the center of gravity of the iron.

7. An electric laundry iron comprising a base, an electric heating unit therefor above the same, a hood covering said base and unit having a portion sloping downwardly and rearwardly from a point forward of the longitudinal center of said base, a hollow deck formed of a separate sheet metal stamping arranged above said sloping portion and secured thereto to form a heat insulating air chamber, and a handle having its forward end attached to said hood and its rear end attached to said deck.

8. An electric laundry iron comprising a base, an electric heating unit therefor above the same, a hood covering said base and unit and extending rearward to form an overhanging portion, said hood having a portion sloping downwardly and rearwardly from a point forward of the longitudinal center of the base, a hollow deck formed of a separate sheet metal stamping having downturned sides and ends, the sides tapering forwardly, said hollow deck being arranged above the sloping portion of said hood and secured thereto forming a heat insulating air chamber, and a handle having its forward end attached to said hood and its rear end resting upon and attached to said deck.

9. An electric laundry iron comprising a base, an electrical heating unit therefor above the same, a hood covering said base and unit and extending rearward therefrom to form an overhanging portion, said hood having a portion sloping downwardly and rearwardly from a point forward of the longitudinal center of the base, a hollow deck formed of a separate sheet metal stamping having downturned sides and ends, the sides tapering forwardly, said hollow deck being arranged above the sloping portion of said hood and having a hook at its forward end engaging an aperture in the hood, a lug secured within the rear portion of said hollow deck, a member forming a bottom for the overhanging portion of said hood, a screw engaging a threaded aperture in said lug forming a securing means for said hollow deck to said hood and also securing said bottom member, a handle having its forward end secured to said hood and its rear end resting upon said hollow deck, and a screw also engaging the threaded aperture in said lug for securing the rear portion of the handle thereto.

10. An electric laundry iron comprising a base, an electrical heating unit therefor above the same, a hood covering said base and unit having a portion sloping downwardly and rearwardly from a point forward of the longitudinal center of said base, a hollow deck formed of a separate sheet metal stamping arranged above the sloping portion of said hood and secured thereto, said deck forming a heat insulating air chamber, and a handle having its forward end secured to said hood and its rear end resting upon and secured to said hollow deck, the portion of said hollow deck between the forward and rear portions of said handle being embossed to form a control instrument panel.

11. An electric laundry iron comprising a base and an electrical heating unit therefor above the same, a hood covering said base and unit having a portion sloping downwardly and rearwardly from a point forward of the longitudinal center of said base and extending beyond the rear end of said base to form an overhanging portion, a hollow deck formed of a separate sheet metal stamping having downturned sides and ends, the sides tapering forwardly, said hollow deck being arranged above the sloping portion of said hood extending to the rear end thereof and forming a heat insulating air chamber, a hook at the forward end of said deck engaging an aperture in said hood, a pair of lugs secured within said deck near the rear end thereof, a member forming a bottom for the overhanging portion of said hood, screws engaging threaded apertures in said lugs and securing both said bottom member and said deck to said hood, a handle having its forward portion secured to said hood and its rear portion resting on said deck, said rear portion having a recess therein opening to the rear, screws within said recess engaging the threaded apertures in said lugs to secure the rear portion of the handle to said deck, electrical terminals extending from said unit through said hollow deck into the recess in said handle, a conductor cord extending into said recess, connecting means between said conductor cord and said terminals also in said recess, and a detachable cover for closing said recess.

FRANK KUHN.
LAURENCE H. THOMAS.